Patented June 28, 1949

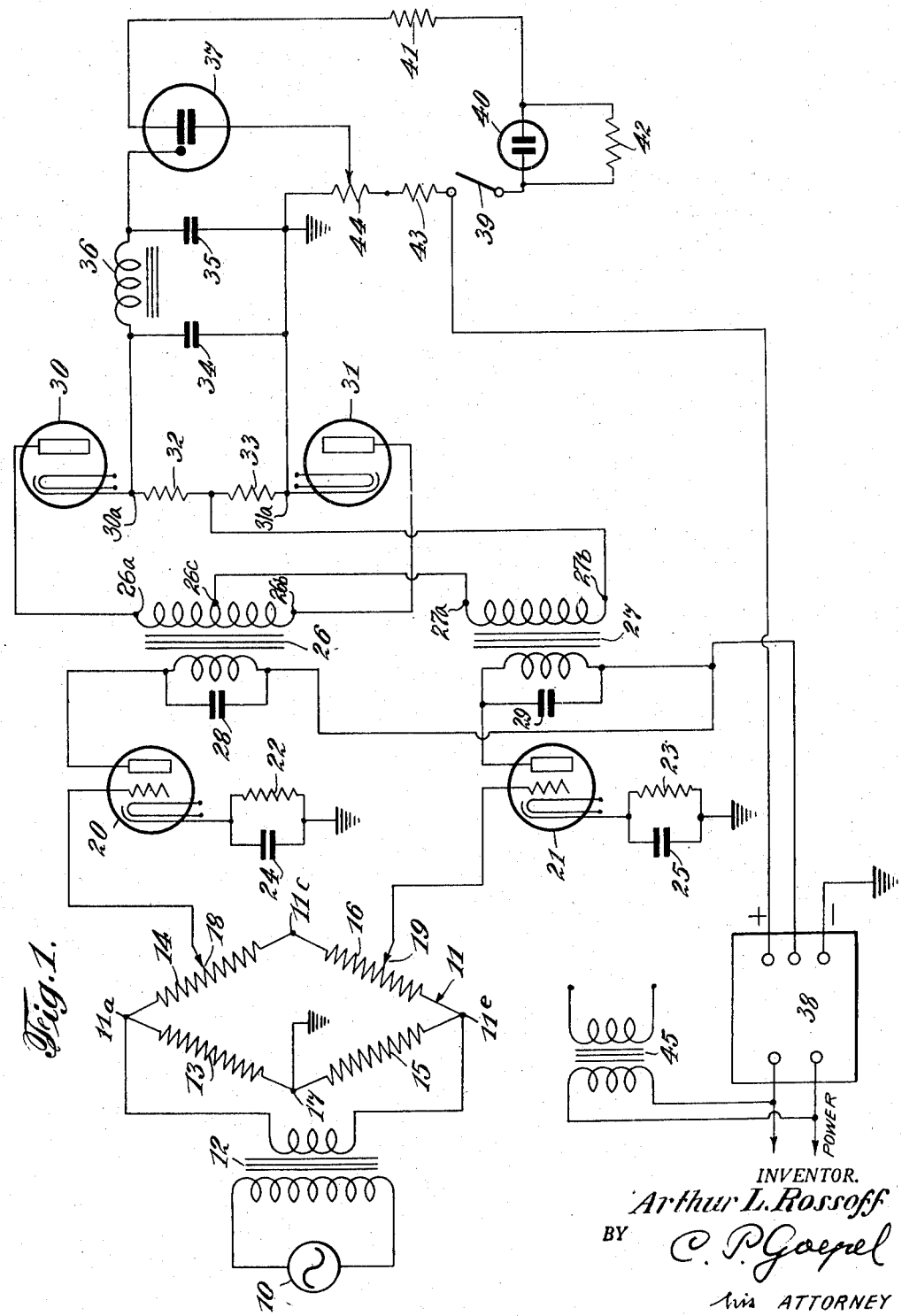

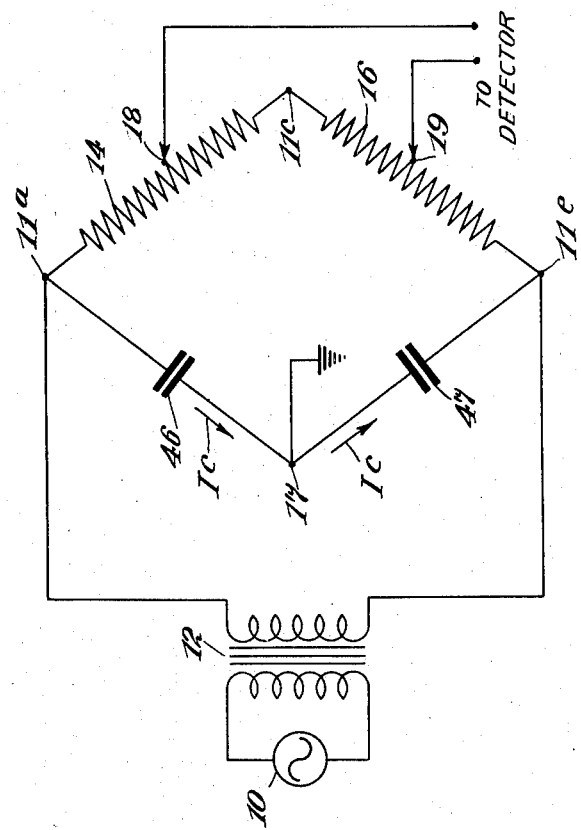
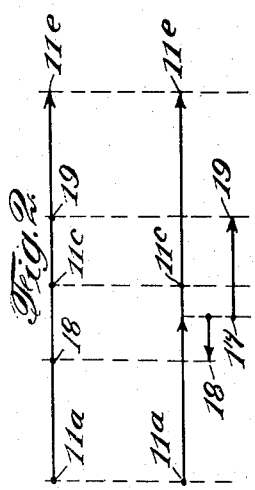
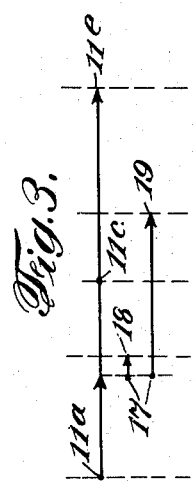
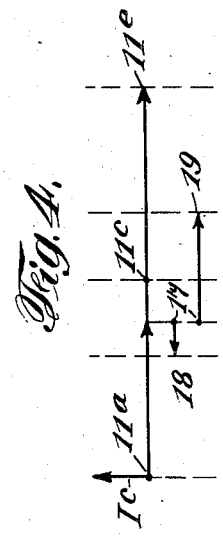
INVENTOR.
Arthur L. Rossoff

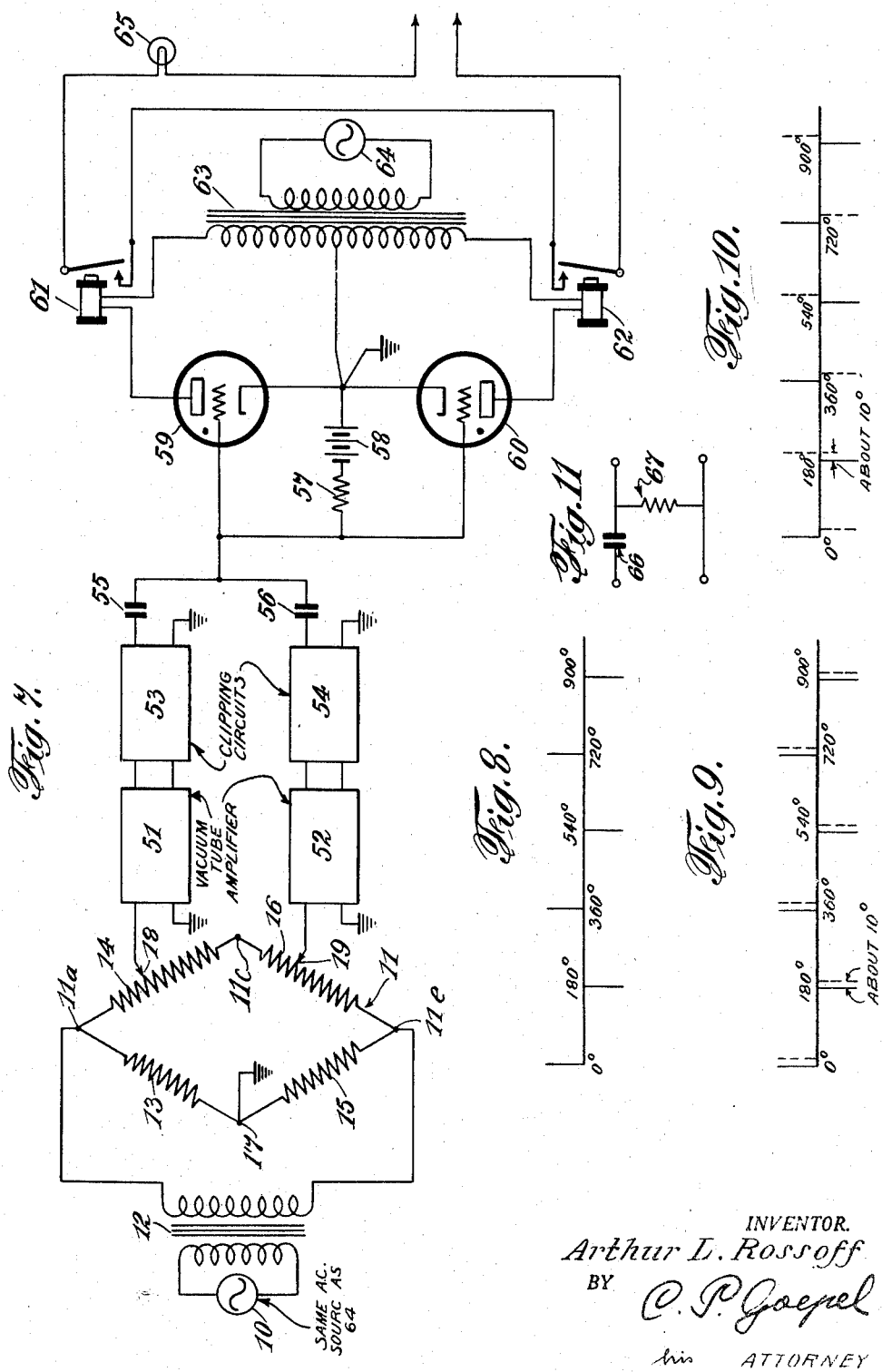

2,474,692

UNITED STATES PATENT OFFICE 2,474,692

HIGH-SPEED PRECISION LIMIT BRIDGE ARRANGEMENT AND METHOD

Arthur L. Rossoff, Richmond Hill, N. Y., assignor to Universal Electronic Laboratories, Inc., New York, N. Y., a corporation of New York Application June 26, 1945, Serial No. 601,641

3 Claims. (Cl. 175—183)

This invention relates to testing of resistors, capacitors, or inductances. It has for its object to provide a means for the rapid production testing of resistors or capacitors or inductances to indicate acceptance or rejection on the basis of a specified percentage tolerance applied to a nominal value. In order to achieve the desired degree of precision (½% or better), use is made of a comparative or bridge system.

Existing systems of this type generally are provided with ratio arms which are tapped at points which correspond to the upper and lower tolerance limits respectively. It is then necessary to switch the detector from one of the limit taps to the other and to note whether or not, in so doing, a passage through balance has occurred. The latter may be indicated by observing the direction of deflection of a galvanometer needle (in the case of a D. C. bridge for resistors) or by observing the action of some type of electronic visual indicator (in the case of an A. C. resistor or reactor bridge). Systems of the type just described are subject to the following limitations and disadvantages: they require a two position switching operation for each test; they require two observations for determining acceptance or rejection; systems employing a galvanometer as detector are subject further to the delay imposed by the mechanical period of the movement and there is a psychological fatigue factor inherent in most of the available indication systems which, along with the above-mentioned time factors, becomes of consequence when considered from the standpoint of the high-speed, large volume testing problem.

The improved bridge system, which is the subject of this invention, incorporates a conventional Wheatstone bridge which is energized with alternating current taken at 60 cycles from the power lines or supplied by an auxiliary oscillator at any desired frequency. The ratio arms are tapped at points which correspond to balance when the unknown arm is permitted to assume each of its specified tolerance limits, and the standard arm is set at the nominal value of the unknown divided by the bridge ratio. As an example, let us assume that a resistor is to be tested whose nominal value is 100 ohms, and to which there is applied a tolerance of plus 10% and minus 5%. Let us further assume that the bridge ratio is 1:10. The standard arm would then be set at 1000 ohms and the ratio arms would be tapped at points which result in balance for values of the unknown of 110 ohms and 95 ohms, respectively. The voltage appearing between the junction point of the standard and unknown arms and each of the ratio arm taps is then fed to the input terminals of a vacuum tube amplifier. The input impedance to the amplifiers should be sufficiently high to prevent any disturbances to the potential distributions of the bridge. This can be accomplished for a large range of frequencies.

These two signals, thus extracted from the bridge, will be shown subsequently to possess certain phase relationships which may be interpreted, in a manner to be described subsequently, to determine whether or not the component under test falls within the specified tolerance limits. It will also be shown that the phase relationships are the same and may be interpreted similarly if the component under test is a resistance, a pure capacitance or a pure inductance. The degree of accuracy which may be attained with testing of practical capacitors and inductors will depend upon the degree of purity or losslessness of these components.

The above-mentioned phase relationships are interpreted and translated into a sensible signal or indication of acceptability of the component under test by a detecting system.

Either a "balanced detector," or a "pulse detector" system or any other suitable system, may be used.

The invention consists of a high speed precision limit bridge system with a suitable detector system, which translates the phase relationship of the voltages at the two limit taps of the bridge system, into an instantaneous sensible signal or indication of whether or not the value of the component under test falls within the specified tolerance limits.

The invention will be more fully described hereinafter, embodiments thereof shown in the drawings, and the invention will finally be pointed out in the claims.

In the accompanying drawings,

Fig. 1 is a diagram of the circuits of the embodiment of my invention employing the "balanced detector" system.

Fig. 2 is a vector diagram showing the phase relationships of the bridge voltages when testing a resistor which is "in tolerance."

Fig. 3 is a vector diagram showing the phase relationships of the bridge voltages when testing a resistor which is "out of tolerance."

Fig. 4 is a vector diagram showing the phase relationships of the bridge voltages when testing a capacitor which is "in tolerance."

Fig. 5 is a vector diagram showing the phase relationship of the bridge voltages when testing a capacitor which is "out of tolerance."

Fig. 6 is a bridge diagram showing the system applied to the testing of capacitors.

Fig. 7 is a diagram of the circuits of that embodiment of my invention which employs the "pulse detector" system.

Fig. 8 is a diagram of a typical train of pulses which would emanate from the differentiating circuit of the "pulse detector" system when only one of the bridge signals is permitted to impinge upon the detector.

Fig. 9 is a diagram showing the superposition of two pulse trains which are in phase, resulting from an "out of tolerance component."

Fig. 10 is a diagram showing the superposition of two pulse trains which are out of phase, resulting from an "in tolerance" component.

Fig. 11 is a diagram of a ten degree phase shifting circuit employed in the pulse detector system.

Similar characters of reference indicate corresponding parts in the various drawings.

Referring to the drawings, and particularly to Figs. 1, 6, and 7, the bridge signal source 10, which is an oscillator of any desired frequency, or, simply, the 60 cycle power line, is fed through transformer 12 to the bridge 11. The transformer provides the proper voltage transformation ratio and also permits the bridge to be electrostatically isolated from the signal source, as is common bridge practice. The bridge is composed of resistors 13, 14, 15 and 16 of which 13 is the standard arm, 14 and 16 the ratio arms, and 15 the unknown. Point 17 is grounded and points 18 and 19 are found so as to result in balance for values of the unknown corresponding to the upper and lower tolerance limits, respectively. Points 18 and 19 are adjustable to permit choice of tolerance limits.

In Fig. 6, the standard and unknown resistors are replaced by the standard and unknown condensers 46 and 47. The application of the bridge to the testing of inductances is identical and is therefore not shown.

Referring now to Figures 2 and 3, there are shown the phase relationships of the bridge voltages occurring when resistors which are "in" and "out of tolerance," respectively, are under test. Figures 4 and 5 show the same phase relationships when a capacitor is under test.

It will be seen that acceptance or rejection of the component under test, whether it be a resistor, capacitor or inductor, depends upon whether or not the point 17 on the bridge is electrically located within the tolerance limits 18—19. In the former case, the detector signals 17—18 and 17—19 are 180 degrees out of phase whereas in the latter, they are in phase. These two signals are then fed into the two channel amplifiers where they undergo sufficient amplification to permit their phase relationships ultimately to be translated into a suitable indication of acceptance or rejection.

These two amplifiers are similar in design and consist of vacuum tubes 20 and 21, cathode bias resistors 22 and 23; cathode by-pass condensers 24 and 25, coupling transformers 26 and 27, and tuning condensers 28 and 29. Since the amplifiers are intended to operate at a single frequency (i. e. the bridge signal frequency) the condensers 28 and 29, are chosen to provide a measure of selectivity. This is desirable from the standpoint of noise and hum suppression.

In the embodiment of the invention which employs the "balanced detector" system, the outputs of the two amplifiers are applied, as shown, through their respective output transformers to the balanced detector. The latter consists of the two balanced diodes 30 and 31 and the balanced load resistors 32 and 33. The output of the balanced detector consists of direct and alternating current components. The direct current component of the output of the detector is a function of the product of the amplitudes of the two input signals, and the polarity depends upon the relative phase of the two signals. If either of the two signals is zero, the D. C. output is zero. A 180 degree phase shift of one signal relative to the other results in a reversal of output polarity.

This may be shown by the following analysis: Consider for the moment that a signal is applied to transformer 26, but none to transformer 27. The point 26c is at the electrical center of transformer 26 so that there are applied to the respective plates of tubes 30 and 31 alternating voltages which are equal in magnitude but 180 degrees out of phase. Since the vacuum tubes 30 and 31 may conduct only when their respective plates are positive, resistor 32 will carry a half wave of current during the half cycle when the plate of tube 30 is positive while resistor 33 will carry a half wave of current during the following half cycle when the plate of tube 31 is positive. There will thus appear across points 30a to 31a half waves of equal magnitude but opposite polarity occurring during successive half cycles. The average or direct current value of this composite wave is zero.

Assume now that a signal is applied to transformer 27 but none to transformer 26. During the half cycle when point 27a is positive with respect to point 27b, the plate of each tube (30, 31) will be positive with respect to its cathode and hence will conduct. During the next half cycle, both plates will be negative and neither will conduct. The voltages appearing across resistors 32 and 33 respectively will consist of half waves of equal magnitude but of opposite polarity occurring simultaneously. These will then cancel each other so that the composite wave appearing across points 30a to 31a is continuously zero.

Consider now that neither signal is zero but that the phase relationships are such that point 27a is positive relative to 27b during the same half cycle when 26a is positive relative to 26c. The resultant voltage applied to the plate of tube 30 will be the sum of the secondary voltage of transformer 27 plus that of the upper half of transformer 26. Thus a large half cycle of current will flow through tube 30, while tube 31 will not conduct or will conduct lightly (depending upon which of the two signals is the larger), since the voltage applied to its plate is the difference between the signal of transformer 27 and that of the lower half of 26. During the next half cycle, tube 30 will not conduct since both components of the voltage applied to its plate are negative. The voltage applied to the plate of tube 31 during this period is the difference between that of transformer 27 and of the lower half of 26. This is either negative or slightly positive, depending upon which of the two signals is the larger, so that tube 31 either conducts lightly or does not at all. In particular, conduction in tube 31 will take place during either of the two successive half cycles but not during both. It is seen then that the average voltage across resistor 32 will be larger than that across 33 so that the output wave across points 30a to 31a will have a positive average value.

It is readily seen that should the phase relationships assumed above be reversed, tube 31 will carry the heavier average current so that the output signal will have a negative average value. Thus, with the proper connection, the application to the bridge of a component which is within tolerance, giving rise to two signals which are 180 degrees out of phase, will cause the balanced detector to emit a direct current component of voltage having positive polarity; whereas an "out of tolerance" component would give rise to a detector output of negative polarity.

This signal is extracted and applied to the low-pass filter, consisting of condensers 34 and 35 and inductor 36. The useful direct current component, thus filtered, is applied to the grid of the gas triode or thyratron 37, which serves as polarized relay. The latter fires only upon the application to its grid of a positive potential. The thyratron is energized from the D. C. power supply 38, through switch 39, neon lamp 40, and resistor 41. The neon lamp 40 is used as a visual indicator. The resistor 41, limits the current to that which is recommended for the lamp used, and the resistor 42, provides a continuous plate circuit path at the instant before the neon lamp 40 discharges. Resistors 43 and 44 comprise a voltage divider, permitting the application of the proper negative bias voltage from the cathode to the grid of the thyratron 37. Transformer 45 supplies the proper voltage to the heaters of the various tubes.

To operate, resistor 44 is adjusted so that the thyratron 37 is on the verge of firing when no signal is being applied to the detector. Then, if the phase relationships of the input signals are those resulting from the insertion of a component which is within tolerance, a positive voltage is applied to the grid of the thyratron, causing it to fire and to illuminate the neon lamp 40. If the component were out of tolerance, a negative voltage would be applied to the grid of the thyratron 37. In this case, the tube would not fire, indicating that the component under test is to be rejected.

In the embodiment of this invention which employs the "pulse detection" system, the bridge signals, having been amplified, by the vacuum tube amplifiers 51 and 52, and being sinusoidal in form, are each fed through the clipping circuits 53 and 54. The clipping circuits, of a type well known in the art, serve effectively to convert the sine waves into square waves of the same frequency and phase. (See Principles of Radar by the members of the staff of the Radar School of Massachusetts Institute of Technology. Published by McGraw-Hill, 1946, chapter 2.) When these square waves are passed through the differentiating circuits, of which the upper consists of condenser 55 and resistor 57, and the lower of condenser 56 and 57, they are converted into a train of pulses such as shown in Fig. 8. It will be seen that successive positive pulses occur every 360 degrees. The effect of the superposition of two such trains of pulses, as appears across the resistor 57, is demonstrated in Figs. 9 and 10. It will be seen that the superposition of two trains of pulses arising out of signals originally in phase (component out of tolerance), results in a train having a 360 degree interval between successive positive pulses. On the other hand, when the component under test is in tolerance, the resultant train has a 180 degree interval between successive positive pulses. This resultant train of pulses is applied simultaneously to the two grids (which are tied together) of the gas triodes or thyratrons 59 and 60. The plates of the thyratrons are fed, in the manner of a full-wave rectifier, from the ends of the secondary of the power transformer 63, the primary of which is excited by the alternating current source 64 at the bridge signal frequency and at a phase which bears a definite relationship to that of the bridge signal. The center-tap of the secondary serves as the common cathode return for the two thyratrons and the battery 58 provides sufficient negative bias to maintain the thyratrons in a normally extinguished condition. The plates of the thyratrons, being thus energized, are alternately positive and ripe for firing. Firing will take place in a particular thyratron if its grid receives a positive pulse at any instant during the half cycle over which its plate is also positive. Thus, if a pulse train such as that shown in Fig. 8 having its positive pulses occurring at 360 degree intervals, were permitted to impinge upon the two thyratron grids, one and only one of the thyratrons would have an opportunity to fire. This firing would occur once every cycle with a duration of somewhat less than a half cycle, the latter depending upon the phase relationship between the bridge signal and the thyratron plate voltage supply. If a combined train of pulses such as that shown in Fig. 9, resulting from the application of the device to a component which is out of tolerance, is applied to the two grids, only one of the thyratrons will fire because the interval between positive pulses is still 360 degrees. However, the application to the grids of a train of the type shown in Fig. 10, having successive positive pulses at 180 degree intervals, resulting from a component which is in tolerance, will result in the alternate firing of both thyratrons.

In series with the thyratron plates are the relays 61 and 62. These have sufficient electrical and mechanical inertia to permit their quiet operation and continuous deflection on the relatively short pulses of plate current. The contacts of these two relays are connected in series and together serve to complete the circuit permitting the power source shown by the arrows in Figure 7, to energize the incandescent lamp 65 in said circuit. Thus the lighting of the lamp, occurring only when both of the thyratrons fire, serves as an instantaneous indication that the component being tested is within tolerance.

For the purposes of simplification, a necessary deviation in the above theory of operation has been omitted, but is here discussed. It will be realized that the superposition of two pulse trains which are exactly 180 degrees out of phase would result in more or less complete interference. This can be avoided by inserting a small relative phase shift (say 10 degrees) between the two bridge signals. This can be accomplished by inserting the phase-shifting network of Fig. 11 between the amplifier 51 and the clipping circuit 53 of Fig. 7. The phase-shift network consists of the capacitor 66 and the resistor 67, the values of which are chosen in accordance with alternating current circuit theory to give the desired phase-shift at the bridge frequency. This can be accomplished by including a phase shift network in one of the amplifiers. If the pulses are sufficiently sharp, interference will not occur, as may be seen by referring to Figures 9 and 10. In order that this small phase shift have no effect upon the triggering of the thyratrons, it is necessary simply that the phase shift between the bridge signal and the thyratron power source be controlled to the extent that the 10 degree succession of pulses occur safely within the same half cycle of the power signal.

Some of the particularly desirable features of the "pulse" type of detector are as follows:

The use of an alternating current power source for the thyratrons instead of a direct current supply makes it unnecessary to extinguish the thyratrons after each individual testing operation. Extinguishing occurs automatically at the end of each cycle and the tubes fire during the succeeding cycle only if the arrival of the next positive grid pulse occurs during the positive half of the plate cycle. This system minimizes the effect of extraneous transient pulses which could cause premature firing of the thyratrons, since a thyratron fired under such circumstances would remain conductive only for the remaining fraction of the cycle. The resulting flash would hardly be discernable.

The foregoing has described a high speed precision limit bridge system. The significant feature of this device is that it performs a simultaneous observation of the voltages at the two limit taps and translates this observation, instantaneously, into an "accept" or "reject" signal. Thus the invention consists of the combination of the improved bridge circuit and a suitable "detector," arranged to perform the above function. Two types of detecting systems have been described. Other detecting systems and variations in the details of the systems described will undoubtedly be suggested to those skilled in the art. These may be employed without departing from the spirit and scope of the invention as set forth in the claims which follow subsequently. The suggested use in the foregoing disclosure, of a visual indicator, such as a lamp, is not intended to imply that the system is limited in application to manual operation. On the contrary, the device may be applied advantageously to a completely automatic or semiautomatic system of component testing and selection. For instance, the components might be fed by means of a conveyor belt and each in turn applied automatically or manually, to the bridge terminals. The bridge output could then be applied to an electro-mechanical trip mechanism, replacing the lamp indicator, which would cause "out of tolerance" components to be rerouted or rejected or, alternatively, would cause "in tolerance" components to be rerouted for distribution, marking, shipping or further processing. It would also be possible to devise a system for the automatic sorting of a batch of components of the same nominal value into the various tolerance categories by the use of a series of amplifier channels, each fed from an appropriate ratio arm tap and each feeding an appropriate combination of detectors.

It is maintained that the scope of the invention as set forth in the claims permits wide latitude in the application of the system to problems of the production testing of electrical components.

I have described several forms of my invention, but obviously various changes may be made in the details disclosed without departing from the spirit of the invention as set out in the following claims.

I claim:

1. In a high speed precision limit bridge arrangement, the combination with a bridge system including a conventional A. C. Wheatstone bridge with interconnected ratio arms, a source of alternating current connected to the bridge at the outer terminals of said ratio arms, a standard arm and a pair of terminals to which a specimen of resistance, inductance or capacitance of unknown value is applied thus comprising an unknown arm, taps located on said ratio arms at points which correspond to balance when the unknown arm is permitted to assume each of its specified tolerance limits, and when the standard arm is set at the nominal value of the unknown, divided by the bridge ratio, of a detector system, said detector system consisting of two vacuum tube amplifier channels, said amplifiers having inherently very high input impedance, the input terminals of said amplifiers being connected respectively to the above mentioned ratio arm taps and commonly to the junction point of said standard and unknown arms, an indicating system to which the two amplified signals emanating from the above-mentioned amplifiers are applied, said indicating system serving the function of comparing the relative phases of the said signals and providing an instantaneous, sensible indication of whether or not the said signals are in phase or 180° out of phase, said two conditions corresponding to the value of the above mentioned unknown specimen falling out of and within, respectively, its specified tolerance limits.

2. In a high speed limit bridge arrangement, the combination with a bridge system including a conventional A. C. Wheatstone bridge consisting of a source of alternating current which energizes said bridge, a standard arm, a pair of terminals to which a specimen of resistance, inductance or capacitance of unknown value is applied, thereby comprising an unknown arm, and a pair of interconnected ratio arms with the said source of alternating current connected to the bridge at the outer terminals of said ratio arms with said ratio arms tapped at points which correspond to a bridge balance when the unknown arm is permitted to assume, in turn, its higher and lower tolerance limits and the standard arm is set at the nominal value of the unknown specimen divided by the bridge ratio, of a detector system consisting of two independent vacuum tube amplifier channels, the input terminals of which are applied, respectively, to each of the above-mentioned ratio arm taps and, commonly, to the junction point of the above-mentioned standard and unknown arms, resulting in the separate amplification of the two bridge signals emanating from the said ratio arm taps, a single phase-shift network in either of the above-mentioned amplifier channels, said phase-shift network resulting in a small relative phase-shift of the said two amplified bridge signals, a pair of clipping circuits in each of the above-mentioned channels, said clipping circuits converting the above-mentioned bridge signals from their sinusoidal form to a square wave form, a differentiating circuit to which are applied both of the above-mentioned square wave signals, said differentiating circuit causing simultaneous differentiation of both of the above-mentioned square waves with the result that positive and negative pulses of short duration are caused to appear coinciding in time with the leading and trailing edges, respectively, of the above-mentioned square waves, two thyratrons, the grids of which are connected together, said grids having applied to them simultaneously the train of pulses which emanates from the above-mentioned differentiating circuit, and the plates of which are energized in phase opposition from an alternating current source having a frequency which is equal to that of the above-mentioned bridge excitation source and which is also in phase with said source, said combined train of pulses being disposed in time in such a manner as to result in the firing of said two thyratrons during alternate half cycles of the above-mentioned energizing current when the value of the above-mentioned unknown specimen falls within the specified tolerance limits and to result, when the value of said specimen falls outside of the specified tolerance, in the successive firing once each cycle of either, but not of both of the said thyratrons, two relays for making the former condition manifest, said relays having sufficient mechanical inertia to permit their continuous and quiet operation when energized by half wave pulses such as are caused to flow in the plate circuits of the above-mentioned thyratrons, each of the said relays being connected in series with each of the plates, respectively, of the said thyratrons so that both of the said relays are energized when the former of the above-mentioned conditions occurs, but only one is energized when the latter of the said conditions occurs, a circuit connected in series with the switching contacts of said relays in such a manner as to result, when both of said relays are energized, in the completion of said circuit, a power source in said circuit, and an indicator such as a lamp or bell or other type of signal connected in said circuit, said power source energizing said indicator when said circuit is completed, said indicator furnishing an instantaneous sensible indication of whether the value of the above-mentioned unknown specimen falls within or out of the specified tolerance limits.

3. In a high speed precision limit bridge arrangement, the combination with a bridge system including a conventional A. C. Wheatstone bridge with interconnected ratio arms, a source of alternating current connected to the bridge at the outer terminals of said ratio arms, a standard arm and a pair of terminals to which a specimen of resistance, inductance or capacitance of unknown value is applied thus comprising an unknown arm, taps located on said ratio arms at points which correspond to balance when the unknown arm is permitted to assume each of its specified tolerance limits, and when the standard arm is set at the nominal value of the unknown, divided by the bridge ratio, of a detector system, said detector system consisting of two vacuum tube amplifier channels, said amplifiers having inherently very high input impedance, the input terminals of said amplifiers being connected respectively to the above mentioned ratio arm taps and commonly to the junction point of said standard and unknown arms, and a balanced modulator to which the two amplified signals emanating from the above-mentioned amplifier channels are applied, the output of said modulator being a pulsating voltage the polarity of which is dependent upon the phase relationships of the said two signals, a low-pass filter circuit, to which the above-mentioned voltage is applied with the result that it is rendered essentially smooth, a thyratron, to the grid of which this said voltage is applied, the plate of said thyratron being energized from a direct current source in series with a lamp or other indicating device so that the said thyratron is caused to fire thus energizing the said lamp when the voltage applied to its grid is of proper polarity, thus indicating whether or not the unknown specimen is within or out of its specified tolerance limits.

ARTHUR L. ROSSOFF.

REFERENCES CITED

The following references are of record in the file of this patent:

UNITED STATES PATENTS

| Number | Name | Date |
|---|---|---|
| 1,665,397 | Wunsch | Apr. 10, 1928 |
| 1,743,386 | Paulson | Jan. 14, 1930 |
| 1,931,054 | Butterfield | Oct. 17, 1933 |
| 1,951,461 | Wilson | Mar. 20, 1934 |
| 2,394,892 | Brown | Feb. 12, 1946 |
| 2,411,916 | Woodyard | Dec. 3, 1946 |